July 4, 1933.  W. R. WILLETT ET AL  1,916,704
DRIVING MECHANISM FOR COTTON PICKERS
Filed Oct. 10, 1930    4 Sheets-Sheet 1
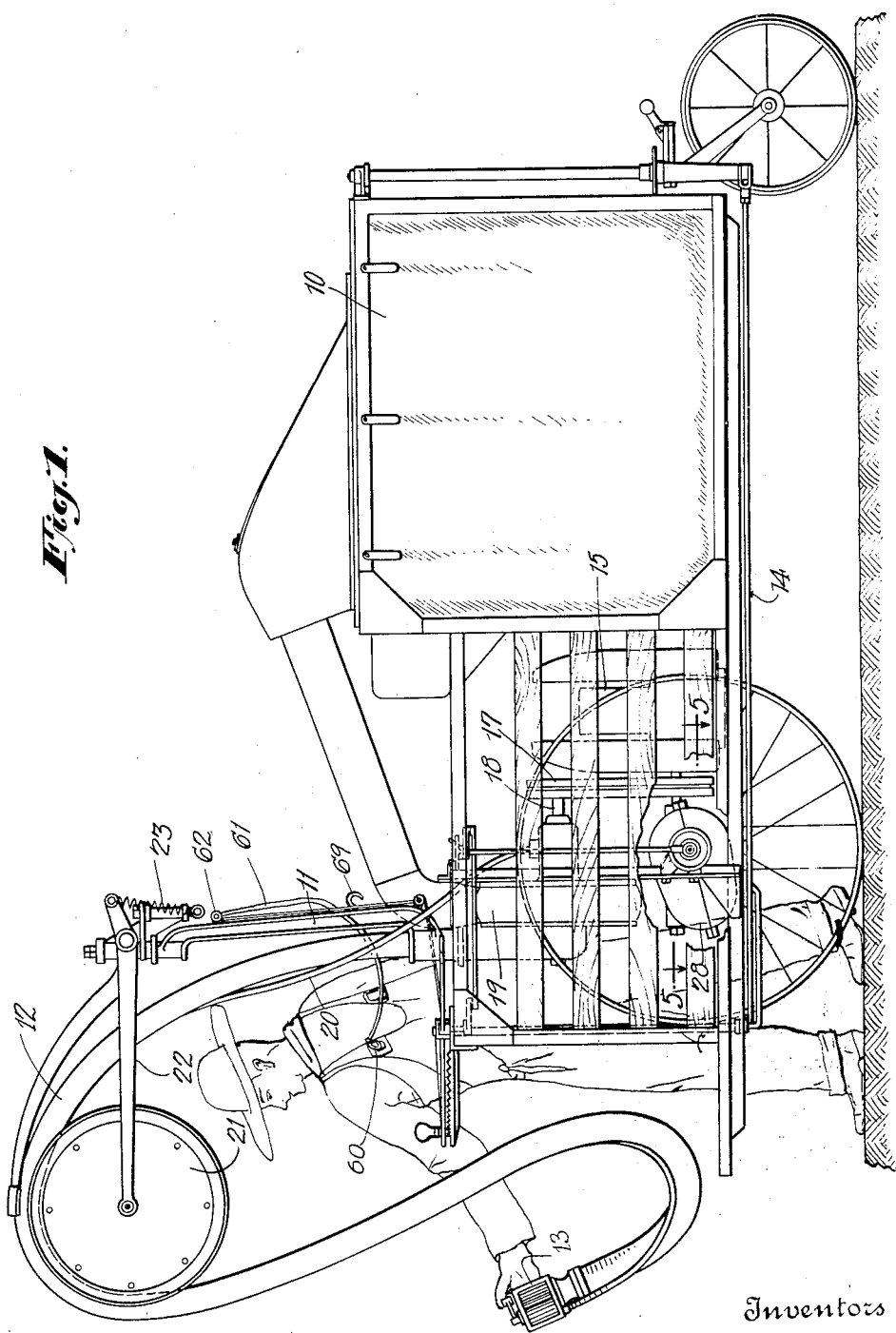

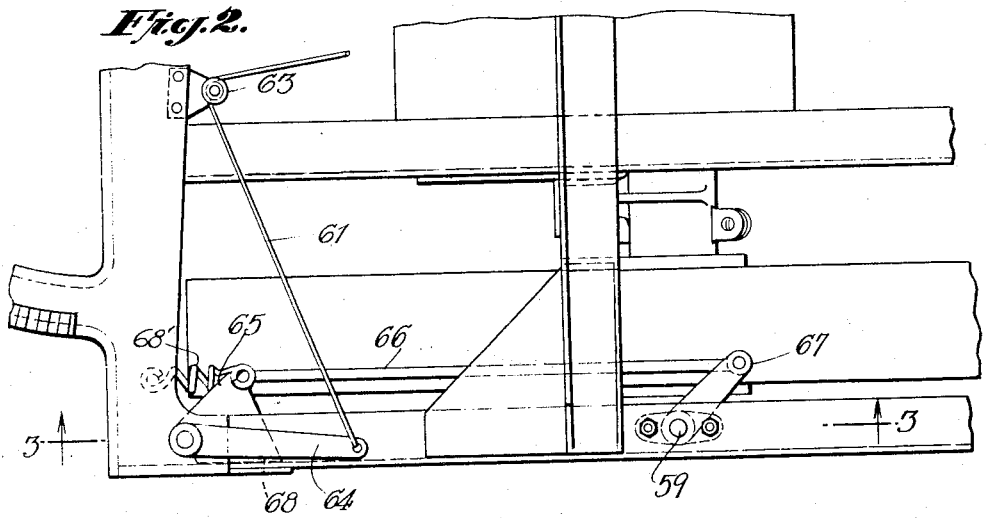
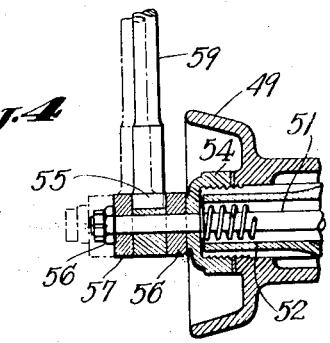
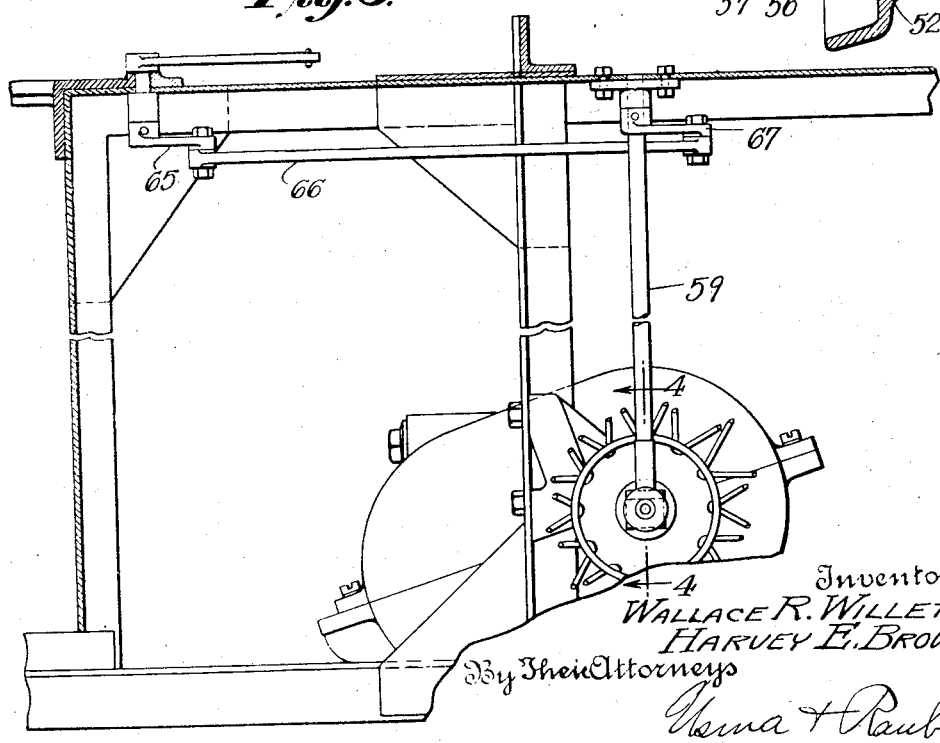

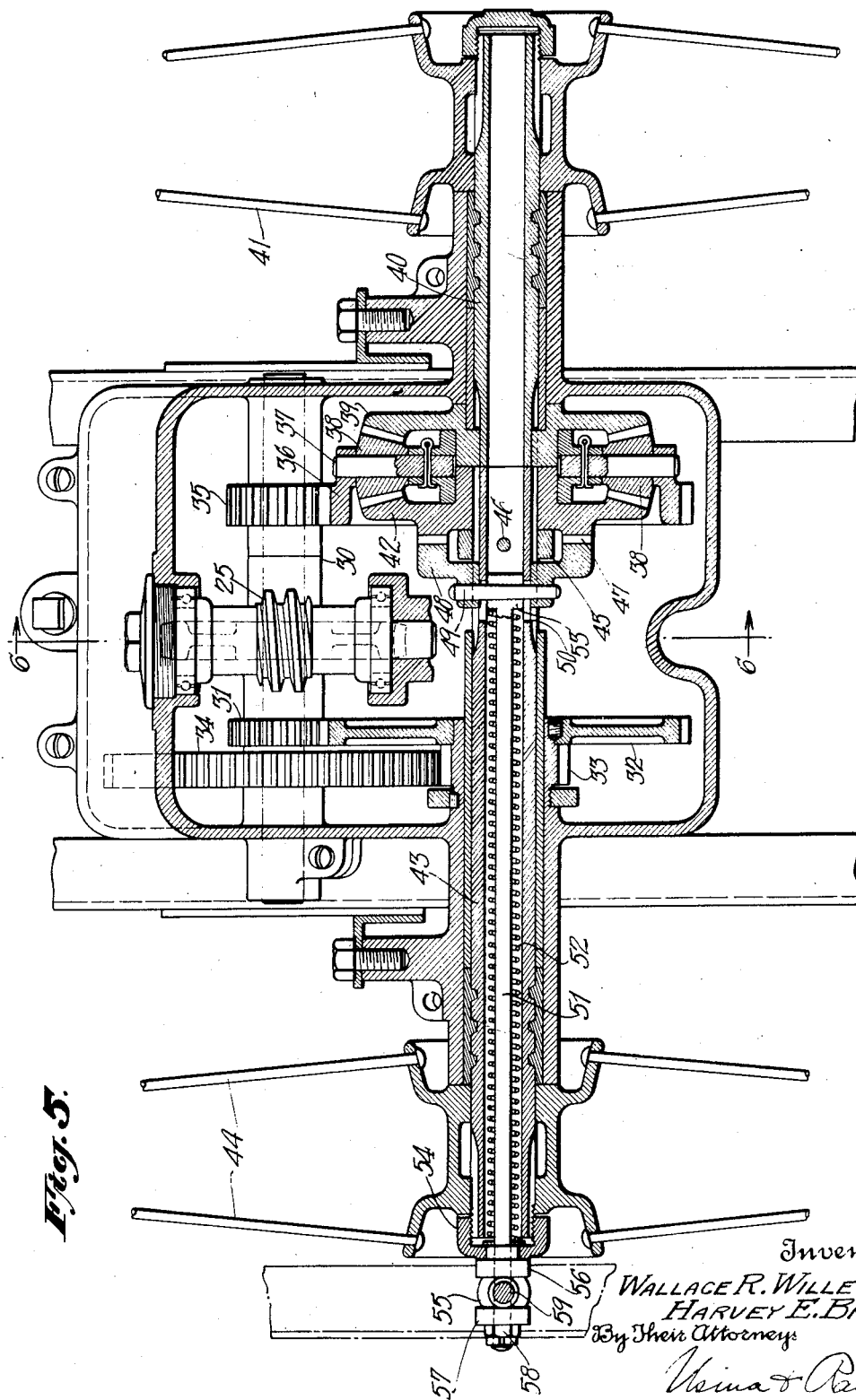

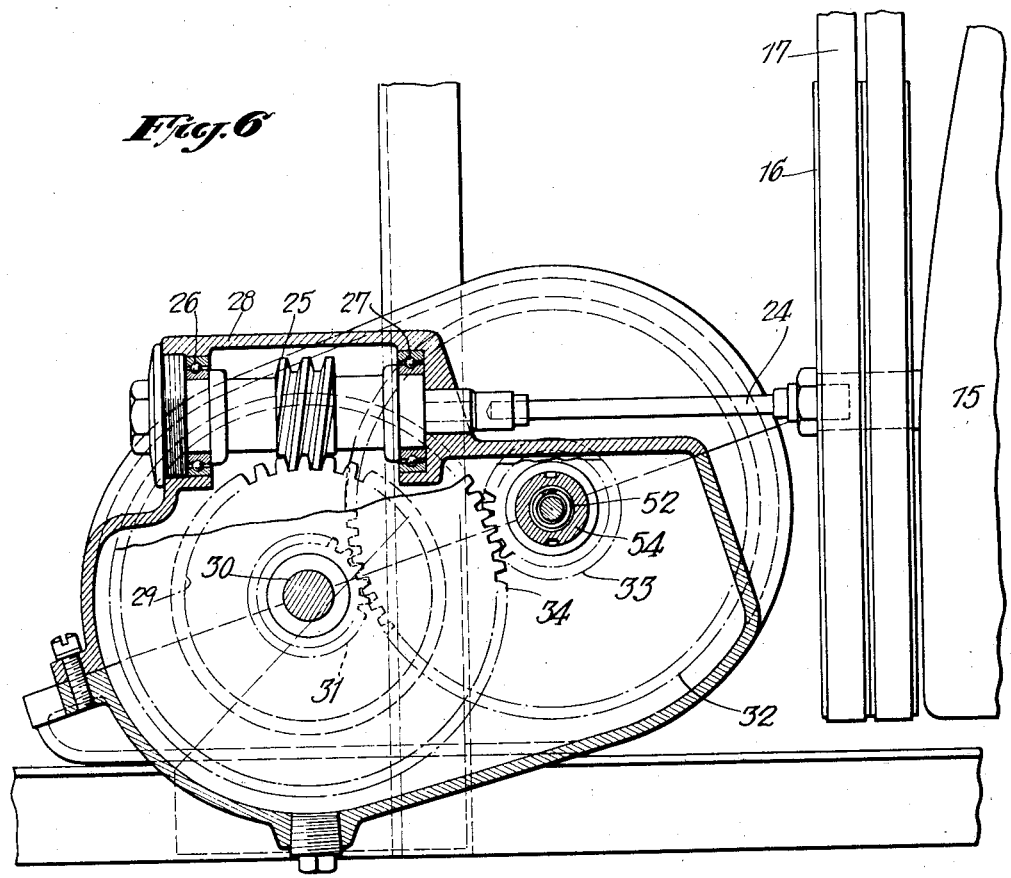
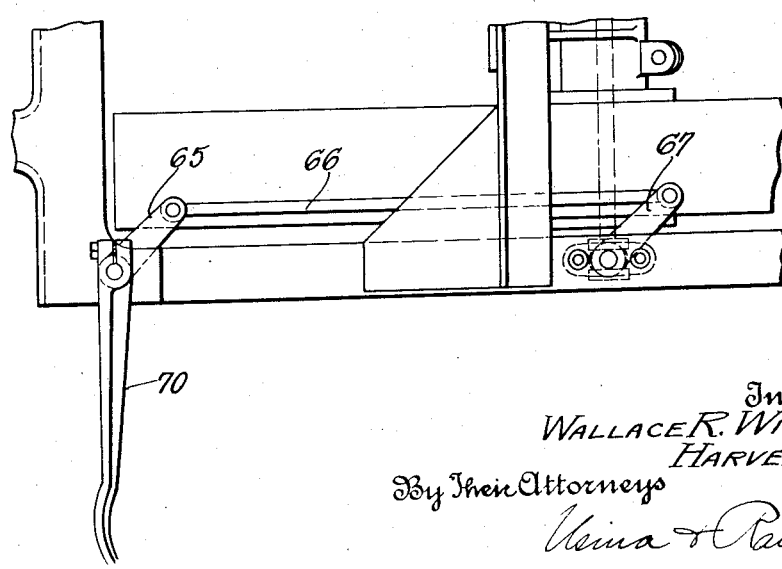

Patented July 4, 1933

1,916,704

UNITED STATES PATENT OFFICE

WALLACE R. WILLETT, OF NEW YORK, N. Y., AND HARVEY E. BROWN, OF ST. LOUIS, MISSOURI, ASSIGNORS TO AMERICAN COTTON PICKER CORPORATION, OF ST. LOUIS, MISSOURI, A CORPORATION OF DELAWARE

DRIVING MECHANISM FOR COTTON PICKERS

Application filed October 10, 1930. Serial No. 487,659.

This invention relates to improvements in cotton pickers and related machines and more particularly to mechanisms whereby a machine driven independently and at a fixed rate of speed is automatically controlled to accompany an operator moving at a variable or changing rate of speed.

In the type of cotton picker machine to which the invention is particularly directed the locks of cotton fiber are detached from the bolls by a mechanically driven picker head held in the hand of the operator and brought manually by the operator into contact with the locks of cotton to be detached and picked. The detached locks are then instantly swept through a conveyer tube to a collecting basket or bag carried on a suitable vehicle which also contains the motive power and mechanism for driving the picker head and for creating suction for the conveyer tube. It is essential, therefore, that the vehicle accompany and be within a limited range of the operator as he moves from one cotton plant to another lengthwise of the rows of cotton.

As the weight of the vehicle and its mechanism is considerable, it is desirable to provide a self-propelled vehicle so that the operator may be relieved of the necessity of dragging it as he progresses along the rows of cotton plants. The rate of movement of the operator is not uniform, however, nor does it vary in any definite manner, but is determined by such haphazard factors as the variable energy of the operator and the abundance or sparseness of the cotton blossoms at various places in the rows.

An object of our invention is to provide a self-propelled mechanism for vehicles of the above type in which the speed of the vehicle automatically adjusts itself to the variable or haphazard movements of the operator moving in the immediate vicinity of the vehicle.

Other objects and features of the invention are to provide a driving mechanism by means of which the vehicle of a cotton picker or similar machine is driven at a constant speed sufficient to keep pace with an operator when moving at a maximum picking rate and by which the mechanism is interrupted or disconnected when the machine advances to a limiting forward position relative to that of the operator; to provide means whereby the interruption of the driving mechanism and the stopping of the vehicle are accomplished without the necessity for any action on the part of the operator; and to provide means that are simple in construction and easy to operate.

Other objects of the invention will more fully appear from the following specification.

The various features of the invention are illustrated in the accompanying drawings in which—

Fig. 1 is a vertical side view, parts being broken away, of a cotton picker embodying a preferred form of our invention.

Fig. 2 is a detail plan view of a part of a cotton picker showing the actuating parts of the control mechanism.

Fig. 3 is a vertical view taken on line 3—3 of Fig. 2.

Fig. 4 is a sectional view taken on line 4—4 of Fig. 3.

Fig. 5 is a sectional view taken on line 5—5 of Fig. 1.

Fig. 6 is a sectional view taken on line 6—6 of Fig. 5.

Fig. 7 is a plan view of a modified form of embodiment of a part of the invention.

In the embodiment of the invention illustrated in the accompanying drawings, the vehicle driving and control mechanism are shown as applied to a cotton picker of the type illustrated in our co-pending application Serial No. 487,658. In this type of cotton picker a cotton receiving receptacle 10 and a standard 11 for supporting the conveyer tube 12 and picker elements 13 are supported on a vehicle 14 of such size that it may move between two adjacent rows of cotton plants. The vehicle 14 is propelled by means of a motor 15 which, through a pulley 16 and belts 17, drives the shaft 18 of a blower 19 for creating a suction through the tube 12 from the picker head 13 to the cotton receiving receptacle 10. The shaft 18 also drives the picker elements 13 through a flexible drive shaft 20 adjacent the conveyer tube 12.

In the operation of a machine of this type, the picker head 13 is freely movable within a limited area about the supporting standard 11. For this purpose the conveyer tube 12 is supported on a swivel or pivoted supporting mechanism at the top of the standard, which comprises a grooved conveyer carrying pulley 21 mounted on a cross arm 22 and maintained by a resilient spring 23 so that the conveyer tube 12 may be extended to its full length in any direction. It is, therefore, apparent that the vehicle 14 must not lag behind the operator a distance greater than that corresponding to the length of the conveyer tube 12 nor advance beyond the limiting range of the conveyer tube.

In the operation of the machine, the machine travels between a pair of rows of cotton plants, moving in the direction to the left of Fig. 1, that is, with the picker elements at the advancing end of the machine. The operator normally walks at one side of the cotton picker machine, either slightly in advance of or to the rear of the picker elements and at the opposite side of one of the rows of cotton plants between which the machine runs. The operator may, however, step in front of the machine, if convenient. Usually there are two cotton picker elements and two operators for each machine, the position of one operator governing the travel of the machine, and the other operator keeping it straight in its travel between the rows.

In the embodiment of our invention shown in the accompanying drawings, the vehicle 14 is driven from the motor 15 through a transmission mechanism which gives the vehicle a speed corresponding to approximately the maximum normal picking speed, for example, a speed of about fourteen feet per minute. In the event, however, that at any particular part of the row the cotton blossoms should be abnormally abundant, or the operator should slacken his efforts, his speed of movement may be less than that of the vehicle 14 and the driving mechanism is disconnected between the motor 15 and the axle of the driving wheel of the vehicle.

Referring more particularly to Figs. 5 and 6 of the accompanying drawings, the transmission mechanism is driven from the pulley 16 through a drive shaft 24, the forward end of which is connected to and drives a worm 25 journalled in ball bearings 26 and 27 in the upper part of a housing 28. The worm 25 meshes with a worm gear 29 loosely mounted on a transverse shaft 30. The rotation of the worm gear 29 is transmitted to the shaft 30 through a speed reduction mechanism comprising a gear 31 integrally or fixedly secured to the gear 29 and meshing with a gear 32 which is in turn secured to a gear 33 meshing with a gear 34 keyed to the shaft 30. Through a gear 35 keyed on the shaft 30 the latter drives a gear 36 mounted on the ring 37 on which the inner or driving gears 38 of an epicyclic gear train or differential are mounted. The gears 38 of the differential drive on one side a gear 39 keyed to a hollow shaft 40 on which is keyed a driving wheel 41 of the vehicle. The other driven gear 42 of the differential gear train is rotatably mounted on a hollow shaft 43 which is aligned with the shaft 40 and carries the driving wheel 44, and is held in position by means of a collar 45 having a pin 46 securing it to the shaft 41. The gear 42 is provided with a toothed clutch face 47 that is engaged by a clutch 48 slidably mounted on the shaft 43. The clutch 48 is slidably fixed to the shaft 43 by means of a pin 49 passing through a longitudinal slot 50 in the shaft 43 and is also secured to a longitudinally slidable shaft 51 within the shaft 43. The shaft 51 is normally urged toward the clutch face 47 of the gear 43 so as to cause its engagement by the clutch 48 by means of a spring 52 encircling the shaft 41 and confined between a shoulder 53 on the shaft 51 and the retaining nut 54 of the wheel 44.

The wheel 44 is keyed at one end of the hollow shaft 43, the other end of which is pinned to the clutch 48. Accordingly, when the shaft 51 is actuated by the spring 52 to push the clutch 48 into engagement with the clutch face 47, the hollow shaft 43 is driven from the differential gear wheel 43 which thereby drives the driving wheel 44 and, thus engaged, the vehicle is driven at a constant rate of speed through the driving wheels 42 and 44. When the operator fails to keep this pace and the vehicle advances to a set limit in relation to the operator, the shaft 51 is drawn outwardly against the action of the spring 52 thereby releasing the clutch 48 from the clutch face 47 and permitting the differential gear 43 to rotate freely and without resistance. The driving gears 38 of the differential thereupon rotate freely on the shafts of the ring 37 and about the periphery of the gear 39, the driving gears 38 serving merely to rotate the free gear 42. Thereupon the vehicle comes to a stop until the operator has reached a position at which the shaft 51 is permitted to be shifted by the spring 52 and thus engage the clutch 48 with the clutch face 47. The withdrawal of the shaft 51 against the pressure of the spring 52 is accomplished by means of a cam 55, Figs. 4 and 5, confined between a collar 56 resting against the outer face of the nut 53 and collar 57 secured by means of a nut 58 to the outer end of the shaft 51. The cam 55 is rigidly mounted on a rock shaft 59 so that when it is in its normal position it permits the shaft 51 to shift toward the clutch face 47 and, when rotated, causes the collar 57 and the shaft 51 to shift to the position shown in dotted lines in Fig. 4.

The shaft 59 is rotated by mechanism that engages the body of the operator and is actuated or released by changes in the relative positions of the vehicle and the operator.

In the specific embodiment of the invention shown in the accompanying drawings, the actuating mechanism for the shaft 59 is secured to the operator, as for example to a belt or part of the operator's clothing, by means of a ring or fastener 60 at the end of a string 61. When the vehicle 14 reaches the forward limit set for the machine, the pull on the ring or fastener 60 is transmitted through the string 61 which extends through a holding loop 62 on the upright 11, Fig. 1, and thence through a guide ring or loop 63 on the vehicle, Fig. 2, to an arm 64 of a bell crank lever pivoted on the frame of the vehicle. The other arm 65 of the bell crank lever is connected through a link 66 and a crank arm 67 to the upper end of the vertical shaft 59. The arrangement of the arms 65 and 67 on their respective shafts is such that when the cam 55 and shaft 59 are in their normal position, the bell crank arm 65 is in the position shown in Fig. 2, with a part of the arm 65 resting against a part of the frame of the vehicle as shown at 68. When a sufficient pull is imparted to the string 61 it rotates the bell crank lever arms 64 and 65 counter-clockwise thus giving a counter-clockwise rotation to the shaft 59 and turns the cam 55 in such a way as to release the clutch 48. When the tension of the string 61 is again released, the bell crank lever arms 64 and 65, and with them the link 66, crank 67, shaft 59 and cam 55, return to normal position. This return of these elements to engaging position may be accomplished by the spring 52 which pulls the collar 57 to the right in Fig. 5, thus acting to twist the cam 55 and its associated elements. The movement of the cam 55 may, however, be aided by a spring 68' confined between a pin on the bell crank lever 65 and the frame of the machine as shown in Figs. 2 and 7. The clutch 48 thereupon engages the clutch face 47 and the vehicle is driven forwardly.

To permanently stop the vehicle without stopping its engine, it is only necessary to hold the string 61 to stopping position and then wind it on a part of the vehicle, as for example, the hook 69, Fig. 1, mounted on the upright 11.

In the modified form of the invention shown in Fig. 7, the bell crank arm 64 is positioned to project outwardly at a right angle to the movement of the vehicle, as indicated at 69, so that it will engage the body of the operator when the vehicle moves forward a sufficient distance relative to the operator. Our invention, therefore, provides a means whereby the vehicle is automatically caused to accompany the operator and to be at all times within a definite range of the picking zone. This is accomplished automatically without any direction or control from the operator and is moreover accomplished in a simple and effective manner.

What we claim is:

1. In an apparatus of the type described, a vehicle to accompany an operator, driving mechanism for said vehicle, and control means having a part to engage the operator and to disconnect said driving mechanism when the vehicle has advanced to a definite position relative to the operator and automatically to connect said driving mechanism when said relative advance of said vehicle is lessened.

2. In an apparatus of the type described, a vehicle to accompany an operator, a motor mounted on said vehicle, transmission means between said motor and said vehicle, pull operated means to disconnect said transmission means, and means to connect said disconnecting means to the body of said operator whereby said transmission means is disconnected when said vehicle reaches a definite distance from said operator, and means automatically to connect said driving mechanism when said distance is less than a predetermined maximum.

3. In a cotton picker having independently movable picker elements directed by an operator, a receptacle for cotton, a conveyer between said picker elements and said receptacle, a vehicle for carrying said receptacle, a driving motor for said vehicle, transmission mechanism between said motor and the wheels of said vehicle, said mechanism comprising a differential connected to opposite wheels of said vehicle, a clutch between a gear of said differential and one of the wheels of said vehicle, means for shifting said clutch, and pull operated means for tying said shifting means to an operator and means automatically to connect said clutch.

4. In a cotton picker having independently movable picker elements operated by an operator, a receptacle for cotton, a conveyer between said picker elements and said receptacle, a vehicle for carrying said receptacle, a driving motor for said vehicle, transmission mechanism between said motor and the wheels of said vehicle, said transmission mechanism comprising a clutch, pull operated means for shifting said clutch out of engagement, and means for connecting said shifting means to an operator independent of said vehicle and means automatically to move said clutch into engagement.

5. In a cotton picker having independently movable picker elements operated by an operator, a receptacle for cotton, a conveyer between said picker elements and said receptacle, a vehicle for carrying said receptacle, a driving motor for said vehicle, transmission mechanism between said motor and the wheels of said vehicle, said transmission mechanism comprising a clutch and means for resiliently moving said clutch into engagement and means connected to the body of an operator outside said vehicle for disengaging said clutch when said operator reaches a limiting distance from said vehicle.

6. A cotton picker comprising a cotton receptacle, a vehicle carrying said receptacle, picker elements carried and operated manually by an operator outside said vehicle, conveyer mechanism from said picker elements to said receptacle, a driving motor, a differential comprising a gear driven by said motor and gears meshing therewith one for each of two wheels of said vehicle, a clutch connecting one of said gears to its wheels and normally pressed into engagement, and means engaging the body of an operator for disengaging said clutch.

7. A cotton picker comprising a cotton receptacle, a vehicle carrying said receptacle, picker elements carried and directed manually by an operator outside said vehicle, conveyer mechanism from said picker elements to said receptacle, a driving motor for driving said picker elements and said conveyer mechanism, transmission mechanism between said motor and the wheels of said vehicle, said transmission mechanism comprising a normally engaged clutch, and means connecting the body of said operator to said clutch to disengage the latter when the distance of said machine from said operator reaches a limit.

8. A cotton picker comprising a cotton receptacle, a vehicle carrying said receptacle, picker elements carried and directed manually by an operator outside said vehicle, conveyer mechanism from said picker elements to said receptacle, a driving motor for driving said picker elements and said conveyer mechanism, transmission mechanism between said motor and the wheels of said vehicle, said transmission mechanism comprising a normally engaged clutch, and a cord connecting the body of said operator to said clutch to disengage the latter when the distance of said machine from said operator reaches a limit.

9. A cotton picker comprising a cotton receptacle, a vehicle carrying said receptacle, picker elements to be carried and operated manually by an operator outside said vehicle, conveyer mechanism from said picker elements to said receptacle, a driving motor for driving said picker elements and said conveyer mechanism, transmission mechanism between said motor and the wheels of said vehicle, said transmission mechanism comprising a spring pressed clutch, a cam for withdrawing said clutch from engagement and means secured to the body of said operator for rotating said cam when the distance between said operator and said vehicle reaches a predetermined limit.

In witness whereof, we have hereunto signed our names.

WALLACE R. WILLETT.
HARVEY E. BROWN.